United States Patent [19]

Takada

[11] Patent Number: 5,212,569

[45] Date of Patent: May 18, 1993

[54] LIGHT BEAM SCANNING APPARATUS CAPABLE OF CHANGING THE SCANNING DENSITY

[75] Inventor: Norihisa Takada, Kanagawa, Japan

[73] Assignee: Fuji Photo Film Co., Ltd., Kanagawa, Japan

[21] Appl. No.: 847,877

[22] Filed: Mar. 10, 1992

Related U.S. Application Data

[63] Continuation of Ser. No. 542,340, Jun. 22, 1990.

[30] Foreign Application Priority Data

Jun. 29, 1989 [JP] Japan .................. 1-168110

[51] Int. Cl.⁵ .................. H04N 1/12; H04N 1/17
[52] U.S. Cl. .................. 358/475; 346/108; 358/300; 358/302; 358/486
[58] Field of Search .................. 346/108; 358/300, 302, 358/451, 445, 475, 486

[56] References Cited

U.S. PATENT DOCUMENTS

| | | | |
|---|---|---|---|
| 3,609,225 | 9/1971 | Stallard | 358/486 |
| 4,447,830 | 5/1984 | Stoffel | 358/486 |
| 4,591,727 | 5/1986 | Gaebelein, deceased et al. | 358/490 |
| 4,612,555 | 9/1986 | Hongou et al. | 358/302 |
| 4,613,877 | 9/1986 | Spencer et al. | 346/108 |
| 4,727,382 | 2/1988 | Negishi et al. | 346/108 |
| 4,835,545 | 5/1989 | Mager et al. | 346/108 |
| 4,862,289 | 8/1989 | Shimada | 346/108 |
| 4,873,537 | 10/1989 | Ohta | 346/108 |
| 4,920,429 | 4/1990 | Jaffe et al. | 358/496 |
| 5,115,328 | 5/1992 | Kadono | 358/486 |
| 5,117,243 | 5/1992 | Swanberg et al. | 346/108 |

Primary Examiner—David K. Moore
Assistant Examiner—Barry Stellrecht
Attorney, Agent, or Firm—Sughrue, Mion, Zinn, Macpeak & Seas

[57] ABSTRACT

The light beam scanning apparatus of the present invention which is capable of recording or reading an image of high quality has a memory unit that stores datum representing the intensity of light in association with scanning density and a selector that selects said light intensity data from said memory unit according to a particular scanning density.

Therefore, when the scanning density is changed by altering the transport speed in sub-scanning direction, the intensity of the light beam emitted from a light source such as a laser is adjusted by the data which is selected by the selector from the memory unit according to the scanning density.

5 Claims, 2 Drawing Sheets

LIGHT BEAM SCANNING APPARATUS CAPABLE OF CHANGING THE SCANNING DENSITY

This is a continuation of application No. 07/542,340 filed Jun. 22, 1990.

BACKGROUND OF THE INVENTION

This invention relates to a light beam scanning apparatus such as an image recording apparatus. More particularly, this invention relates to a light beam scanning apparatus capable of recording an image of high quality with the density of light beam scanning lines being changed by altering sub-scanning speed.

Light beam scanning apparatuses using a raster scanning method are applied in various image recording apparatuses. With such light beam scanning apparatuses, a light beam reflected and deflected in the direction of main scanning by means of a light deflector such as a galvanometer mirror, is applied at a predetermined position onto a sheet-like subject, such as a recording material, to be scanned that is transported in a sub-scanning direction that is generally perpendicular to the main scanning direction. Hence, in light beam scanning apparatuses that adopt a raster scanning method, the sheet-like subject is scanned two-dimensionally with a light beam to effect image recording, or image reading.

As improvements of light beam scanning apparatuses that adopt a raster scanning method, there have been proposed and used commercially those apparatuses in which the transport speed in the sub-scanning direction is reduced so that the scanning density is increased to enable the recording of a higher-quality image. Instead of changing the time interval between successive main scanning cycles, the speed at which the sheet-like subject is transported in the sub-scanning direction is made slower than in the ordinary image recording mode, where by the interval between scanning lines on the sheet-like subject is reduced to enable the production of a high-quality image at an increased recording density.

With such light beam scanning apparatuses that are adapted to change the density of scanning lines, the intensity of the light beam applied to the sheet-like subject must be reduced in proportion to the increase in scanning density. If the intensity of light beam applied remains unchanged despite the increase in scanning density, overexposure takes place in the image recording apparatus and line in characters or line images will become so thick that "blocking of shadows" and other defects will result and preclude the recording of a satisfactory image.

When the scanning density is to be increased by slowing down the transport speed in the sub-scanning direction, the intensity of the light beam applied is conventionally reduced by inserting a ND (neutral density) filter or some other means of adjusting the intensity of the light into the path of the light beam. However, in order to implement this method, not only is a filter inserting mechanism necessary but also the space for permitting the insertion of the filter is necessary. The light beam scanning apparatus will inevitably become bulky and complicated in construction, with its cost increasing. Further, the light beam passing through the ND (neutral density) filter will experience wavefront aberrations, so in order to achieve satisfactory image recording, high-quality filters that have a surface with a high precision of flatness are required but, then, this results in considerable increase in the cost of the light beam scanning apparatus.

SUMMARY OF THE INVENTION

An object, therefore, of the present invention is to solve the aforementioned problems of the prior art by providing a light beam scanning apparatus that adopts a raster scanning method, that is capable of changing the scanning density by altering the sub-scanning speed and which yet is inexpensive, small in size and simple in construction without using ND filters or any other means of adjusting the intensity of the light beam applied.

This object of the present invention can be attained by a light beam scanning apparatus that uses a light beam deflected in the direction of main scanning in order to perform two-dimensional scanning of a sheet-like subject to be scanned that is moving in a sub-scanning direction which is generally perpendicular to said direction of main scanning, which apparatus comprises a light beam source that emits said light beam, means of altering the speed at which said sheet-like subject is moving in the sub-scanning direction in order to change the density of scanning lines formed of said light beam, a memory unit containing at least two versions of data representing the intensity of the light beam in association with the density of said scanning lines, and selection means for selecting either one of said at least two versions of data from said memory unit in accordance with the desired density or said scanning lines.

In a preferred embodiment, said data on the intensity of the light beam corresponds to a single scanning with said light beam.

In a further preferred embodiment, said data representing the intensity of the light beam that corresponds to a single scan by said light beam causes the light beam to be modulated in accordance with the change in scanning speed for a main scanning line on the sheet-like subject to be scanned.

In another preferred embodiment, said light beam source is a laser diode.

In still another preferred embodiment, said sheet-like subject to be scanned is a recording material.

DETAILED DESCRIPTION OF THE INVENTION

The light beam scanning apparatus of the present invention is adapted to change the scanning density by altering the transport speed in a sub-scanning direction. In the case where this apparatus is incorporated in an image recording apparatus, it offers the advantage that an image of high quality can be produced as required at a higher recording density than in an ordinary recording mode.

In accordance with the present invention, the intensity of the light beam to be applied when the transport speed in the sub-scanning direction is reduced to increase the scanning density is adjusted by first selecting the version of data representing the intensity of the light stored in the memory unit that is associated with the set value of the scanning density (i.e., the transport speed in the sub-scanning direction) and then causing the light beam source such as a laser diode to emit a light beam in an amount that is properly controlled in accordance with the thus selected data. The so adjusted light beam is modulated or turned on and off or driven in both ways in accordance with the image information of interest, whereby a desired image is recorded on the recording material.

The means of adjusting the intensity of the light has been necessary in the conventional light beam scanning apparatuses that are adapted to control the scanning density but the apparatus of the present invention does not have to use such adjusting means. It also obviates the need for providing the space for accommodating such adjusting means and the mechanism for permitting their insertion, whereby said apparatus can be constructed with a simple mechanism, in a small size and at a low cost.

ND filters which are commonly used as the means of adjusting the intensity of the light are expensive and of high quality since they are required to have surface with a sufficiently high precision of flatness to prevent the occurrence of wavefront aberrations in the light beam when it passes through said ND filters. Thus, the light beam scanning apparatus of the present invention which obviates the need for using such ND filters can be manufactured at a markedly lower cost than the conventional versions of apparatuses that are adapted for adjustments of scanning density.

The light beam scanning apparatus of the present invention is described below in greater detail with reference to the preferred embodiments shown in the accompanying drawings.

Figure 1:
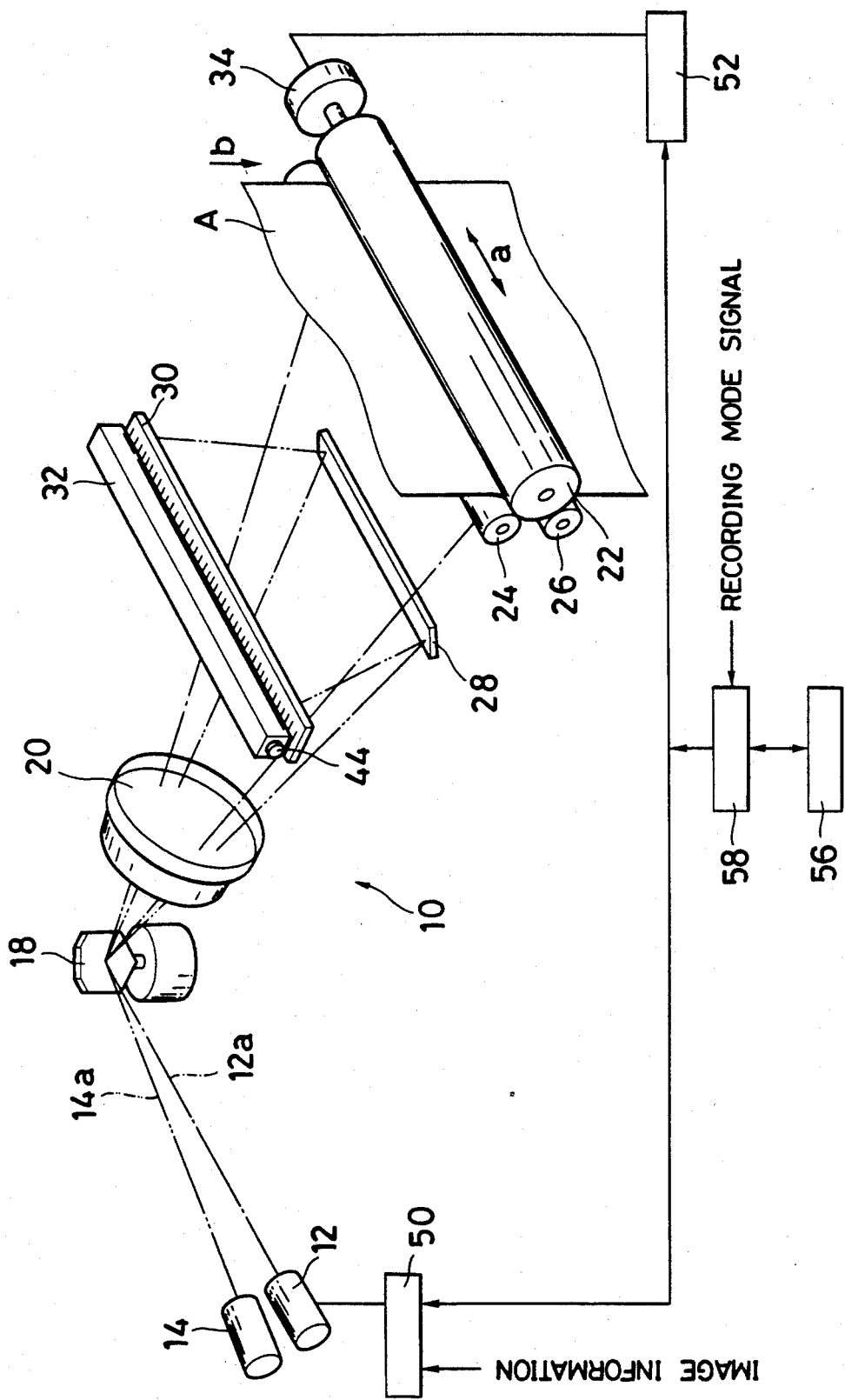
FIG. 1 is a perspective view that shows schematically an image recording apparatus incorporating a light beam scanning apparatus according to an embodiment of the present invention.

FIG. 1 is a perspective view that shows schematically an image recording apparatus that incorporates a light beam scanning apparatus according to a preferred embodiment of the present invention. The image recording apparatus which is generally indicated by 10 in FIG. 1 is adapted to record characters or line images by a raster scanning method and, through adjustment of the speed at which a recording material A is transported in the sub-scanning direction, the image recording mode of the apparatus can be set either to a normal mode in which the image is recorded at the ordinary scanning density or to a high-quality image mode in which an image of high quality is recorded at a higher scanning density.

The image recording apparatus 10 is composed of the following basic components: a recording unit 12 that emits a recording laser beam 12a (which is hereinafter referred to as "a recording beam 12a"); a grating unit 14 that emits a grating laser beam 14a (which is hereinafter referred to as "a grating beam 14a"); a galvanometer mirror 18; an fθ lens 20; an exposure drum 22 for retaining the recording material A in a predetermined position; nip rollers 24 and 26 for transporting the recording material A in contact with the exposure drum 22; an elongated mirror 28 for reflecting the grating beam 14a in a predetermined direction; and a grating 30 and a light collecting bar 32 that cooperate with each other to serve as a means for generating an image sync signal. A motor 34, used as a rotational drive source, is coupled to the rotating shaft of the exposure drum 22.

Connected to the recording unit 12 is a recording beam drive circuit 50 that allows said recording unit to emit recording a modulated beam 12a in accordance with the version of data representing the intensity of light that is associated with the selected recording mode, and which turns on and off the recording beam in accordance with the image information to be recorded. Connected to the motor 34 is a motor control circuit 52 that causes the motor 34 to rotate at a speed that is associated with the selected recording mode. Each of the drive circuits is connected to a selector 58 that is supplied with a signal for the selected recording mode and which selects the appropriate version of representing data the intensity of light from a memory unit 56, so that a signal for the selected data is fed to the recording beam drive circuit 50 and a velocity signal associated with the selected recording mode is fed to the motor control circuit 52.

The recording beam 12a and the grating beam 14a which are emitted from the units 12 and 14, respectively, are reflected and deflected by the galvanometer mirror 18 in the direction of main scanning indicated by the two-headed arrow a. The two beams are then adjusted by the fθ lens 20 in such a way that they respectively form predetermined beam spots on the surface of the recording material A. The spot of recording beam 12a focuses on the recording material A which is being transported by the exposure drum 22 in contact with the nip rollers 24 and 26 in the sub-scanning direction indicated by the arrow b. In other words, the recording material A is exposed by two-dimensional scanning with the recording beam 12a to record an image thereon. The grating beam 14a is reflected by the elongated mirror 28 to scan the grating 30 and produce an image sync signal, or a signal for detecting the position of the recording beam 12a.

The recording unit 12 which emits the recording beam 12a is a unitary assembly composed of a laser diode that emits a recording light beam and a collimator lens that shapes the light beam emitted from said laser diode. The recording unit 12 is connected to the recording beam drive circuit 50. In response to a signal from the data representing the intensity of light that is selected by the selector 58, further described below, the recording beam drive circuit 50 modulates the laser diode in the recording unit 12. The drive circuit 50 also receives image information from an image information source not shown and turns on and off the laser diode in the recording unit 12 in accordance with the image to be recorded.

The grating unit 14 emits the grating beam 14a and has essentially the same construction as the recording unit 12. Thus, it is a unitary assembly composed of a laser diode serving as a light source for producing a grating scanning light beam and a collimator lens that shapes the light beam emitted from said laser diode.

The light beam source that can be used in the recording unit and the grating unit of the present invention is in no way limited to the laser diode such as a laser diode (LD) and may be selected from various known light beam sources such as a light emitting diode and the like.

The recording beam 12a and the grating beam 14a emitted from the respective units 12 and 14 are then reflected by the galvanometer mirror 18 serving as a light deflector and deflected in the main scanning direction indicated by the two-headed arrow a. The light deflector that can be used in the present invention is in no way limited to the galvanometer mirror 18 and may be selected from various known light deflectors such as a resonant scanner and a polygonal mirror.

The light beams reflected and deflected by the galvanometer mirror 18 are then launched into the fθ lens 20 and are adjusted so that they are focused at predetermined positions in the form of predetermined beam spots. The grating beam 14a passing through the fθ lens 20 is reflected upward by the elongated mirror 28 to scan the grating 30. The grating beam 14a passing through the grating 30 is collected by the collecting bar 32 and its intensity is measured with a photodetector 44 such as a photomultiplier tube for conversion to an electric signal. The grating beam 14a incident on the grating 30 has been reflected and deflected in the main scanning direction (arrow a) by the galvanometer mirror 18 in entirely the same way as in the case of the recording beam 12a which is to scan the recording material A. Hence, a sync signal for detecting the correct position of the recording beam 12a can be obtained from the electric signal that has been produced by the periodic change in the intensity of light in response to the scanning of the grating 30 with the grating beam 14a. The sync signal thus obtained allows the main scanning of the recording material A to be carried out in a more precise way by means of the recording beam 12a.

Figure 3:
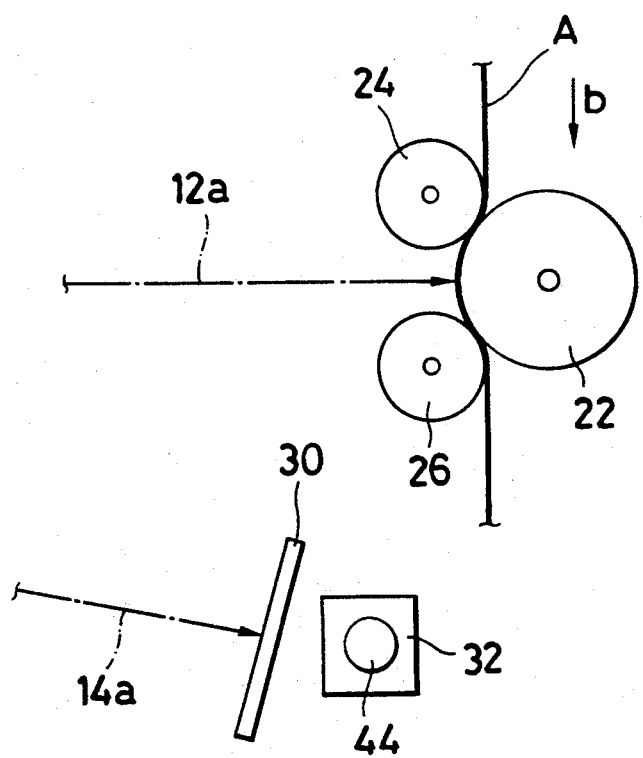
FIG. 3 is a partial front view showing schematically a light beam scanning apparatus according to another embodiment of the present invention.

In the embodiment shown in FIG. 1, the grating beam 14a is reflected upward by the elongated mirror 28 for scanning the grating 30. The present invention, however, is not limited to this particular embodiment and the grating 30 and light collecting bar 32 may be positioned as shown in FIG. 3 so that they receive the light beam from the grating unit 14 that travels downward of the exposure drum 22. This arrangement has the advantage of eliminating the elongated mirror 28 so as to construct a light beam scanning apparatus at a further reduced cost.

The recording beam 12a passing through the fθ lens 20 is focused on the recording material A on the exposure drum 22 that is being transported in the sub-scanning direction (arrow b) in contact with the nip rollers 24 and 26 as it is held in a predetermined image recording position, whereby said recording material is exposed through two-dimensional scanning for image recording.

One end of the rotating shaft of the exposure drum 22 is connected to the motor 34 which serves as a rotational drive source for the exposure drum 22.

The image recording apparatus 10 incorporating the light beam scanning apparatus of the present invention is capable of selection between two recording modes, one being a normal mode in which image recording is carried out at an ordinary transport speed in the sub-scanning direction, and the other being a high-quality image mode in which the transport speed in the sub-scanning direction is reduced to, for example, one half the ordinary speed whereas the time interval between successive main scanning cycles is held equal to the value for the normal mode, whereby image recording is performed at an increased scanning density that is twice the value for the normal mode. Hence, in order to achieve selection between these two modes, the motor 34 used in the image recording apparatus 10 must be adapted to change the rotational speed in accordance with the recording mode selected. There is no particular limitation on the motor 34 as long as it is capable of changes in the rotational speed and it may be selected from among various known motors such as a servo motor and a stepping motor.

Preferably, the motor 34 is equipped with a pulse encoder or some other means for rotational speed detection so that the rotational speed of the motor 34 can be controlled by the motor drive circuit 52 to be described below in accordance with the result of detection by said rotational speed detector.

The present invention also is not limited to the embodiment shown in FIG. 1 where the transport speed in the sub-scanning direction is changed by directly altering the rotational speed of the motor 34. If desired, a fixed-speed motor may be combined with a gear box or some other speed changing means that is capable of changing the transport speed of the recording material A.

The motor 34 is connected to the motor control circuit 52 that receives a signal for the recording mode set by the selector 58 and which accordingly causes the motor 34 to rotate at a predetermined speed. This motor control circuit 52 and the aforementioned recording beam drive circuit 50 are both connected to the selector 58. The selector 58 receives a signal for a particular recording mode, selects the appropriate version of data representing the intensity of light from the memory unit 56, and sends two signals to the recording beam drive circuit 50 and the motor control circuit 52. The signal sent to the drive circuit 50 is a modulation signal for the recording beam 12a which is associated with the selected data representing the intensity of light, and the signal sent to the control circuit 52 is a rotational speed signal for the motor 34 which is associated with the particular recording mode of interest.

The memory unit 56 stores different versions of data representing the intensity of light of the recording beam 12a in correspondence to the recording modes of interest. Thus, in the embodiment shown in FIG. 1, two versions of data representing the intensity of light for one scan with the recording beam 12a are stored in the memory unit 56, one being associated with recording in the normal mode and the other associated with recording in the high-image quality mode.

Figure 2:
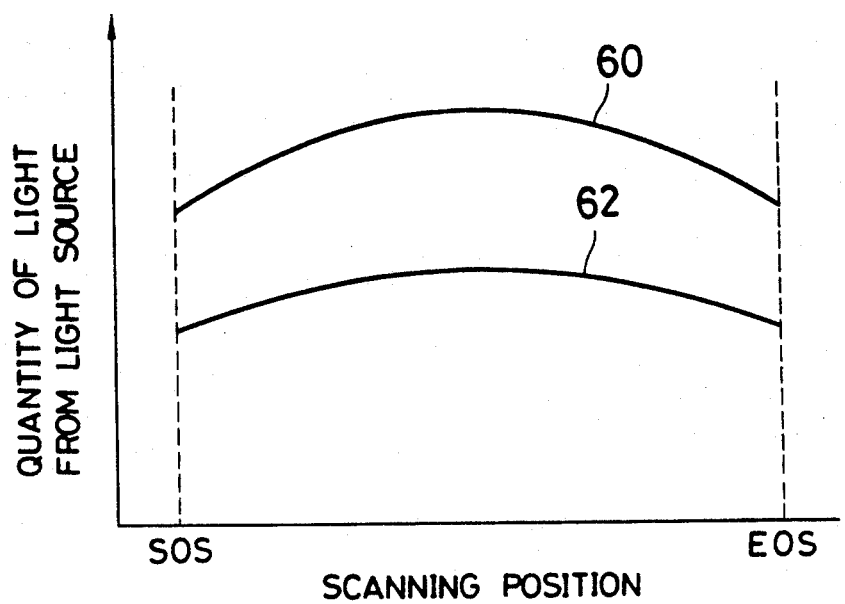
FIG. 2 is a diagram showing an example of the data on representing the intensity of light that is stored in the memory unit of the light beam scanning apparatus shown in FIG. 1.

FIG. 2 shows an example of the data representing the intensity of light for the normal and high-image quality modes to be stored in the memory unit 56. The vertical axis of the graph shown in FIG. 2 plots the intensity of light emitted from the laser diode in the recording unit 12, and the horizontal axis plots the position on a scanning line that is scanned with the recording beam 12a. Curve 60 in FIG. 2 shows the data on the intensity of light for the normal mode, and curve 62 shows the data for the high-image quality mode. SOS on the horizontal axis denotes the position for the "start of effective scanning" and EOS denotes the position for the "end of effective scanning". As will be explained hereinafter in detail, plots of the data on the quantity of light draw curves since the speed of main scanning with the recording beam 12a on the recording material A differs depending upon the position across the width of a single scanning line.

As already mentioned, the image recording apparatus 10, if it is in the high-image quality mode, slows down the transport speed of the recording material A in the subscanning direction so that the scanning density is increased to produce an image of high quality at an enhanced recording density. If the recording in such a high-image quality mode is performed with the same intensity of the recording beam 12a as in the normal mode, overexposure will result due to the excessive recording density and, in the example shown where characters or line images are to be recorded, lines become so thick that "blocking of shadows" or other defects will occur to preclude satisfactory image recording. Hence, it is necessary that the intensity of the recording beam 12a be reduced in the high-image quality mode in accordance with the density of main scanning lines (or the reduced transport speed in the sub-scanning direction).

The memory unit 56 in the image recording apparatus 10 of the present invention has two versions of data representing the intensity of light stored in it that are associated with the normal recording mode and the high-quality image recording mode. The selector 58 selects the proper data on the intensity of light from the memory unit 56 in accordance with the specifically set recording mode and transfers a signal for the selected data to the recording beam drive circuit 50. The selector 58 also supplies the motor control circuit 52 with a velocity signal that is associated with the setting of recording mode.

In response to this velocity signal, the motor control circuit 52 causes the motor 34 to rotate at a speed that is proportional to said velocity signal. At the same time, the recording beam drive circuit 50 modulates the laser diode in the recording unit 12 in accordance with the transferred data representing the intensity of light. The circuit 50 also turns on and off the laser diode in accordance with the image information sent from the image information source not shown, whereby a desired image is recorded with the recording beam 12a having an intensity of light that is determined by the data representing the intensity of light for the specifically set recording mode. In this connection, it should be noted that the laser diode is considered to be "turned off" even when it emits an insufficient intensity of light beam to cause exposure of the recording material A.

In the present invention, the intensity of the recording beam 12a is adjusted as appropriate for each of the recording modes to be selected, so the ND filters and the mechanism for effecting their insertion that have been necessary in the prior art light beam scanning apparatuses can be dispensed with, thereby enabling the construction of a compact, simple and inexpensive light beam scanning apparatus.

The image recording apparatus 10 shown in FIG. 1 is intended to record characters and line images. Hence, image recording is carried out with the emission of recording beam 12a being turned on and off by means of the recording beam drive circuit 50 in accordance with the image to be recorded. If the speed of main scanning with the recording beam 12a for a single scanning line on the recording material A is constant over the range of from SOS to EOS on the horizontal axis of the graph shown in FIG. 2, the intensity of the recording beam 12a may also be held constant, and hence, the laser diode as the light source of the recording beam 12a may be modulated uniformly in accordance with a particular recording mode of interest. However, in a real light beam scanning apparatus of the type incorporated in the image recording apparatus 10 shown in FIG. 1, the galvanometer mirror 18 is caused to swing at such a high speed that the speed of main scanning with a light beam on the sheet-like subject such as the recording material A will usually be faster in the central portion of the scanning line that at either end thereof. Therefore, in order to accomplish satisfactory image recording or reading, the intensity of the light beam must be adjusted in accordance with the change in the speed of scanning with said light beam for a single scanning line on sheet-like subject to be scanned. To meet this need, the light beam scanning apparatus of the present invention is so designed that data representing the intensity of light for a single line is stored in the memory 56 as in the image recording apparatus 10 shown in FIG. 1, and such data representing the intensity of light is rendered to be associated with the change in the speed of main scanning with the recording beam 12a on the recording material A, whereby both the central part and either end portion of the image to be formed are exposed with a uniform intensity of light to insure a satisfactory image to be recorded uniformly over the entire surface of the recording material.

The image recording apparatus 10 shown in FIG. 1 is capable of selection between two recording modes, i.e., a normal mode and high-image quality mode, and accordingly two versions of data representing the intensity of light are stored in the memory unit 56. The present invention, however, is not limited to this particular case and the apparatus may be adapted to select other recording modes such as a plurality of high-image quality modes of different degrees or a high-speed mode in which the transport speed in the sub-scanning direction is increased to permit image recording with a greater intensity of light, and in such cases, the data to be stored in the memory unit 56 may consist of different versions that correspond to the number of the recording modes to be selected.

In the apparatus shown in FIG. 1, the data representing the intensity of light to be stored in the memory unit 56 is for a single scanning line of the recording beam 12a that is associated with the specific recording mode to be selected. The present invention, however, is not limited to this particular case and a signal for modulating the laser diode to adjust the intensity of recording beam 12a to a predetermined level may be directly stored in the memory unit 56 as data representing the intensity of the recording beam.

Further, the image to be recorded with the apparatus of the present invention also is not limited to characters or line images and, needless to say, continuous tone images, halftone (dot) images or color images may be recorded on silver halide photographic materials or images may be recorded electrostatically.

While the light beam scanning apparatus of the present invention has been described on the foregoing pages with reference to the preferred embodiments shown in the accompanying drawings, it should of course be understood that the present invention is in no way limited to these particular embodiments and that various modifications and improvements are possible without departing from the scope and spirit of the present invention.

As described in detail on the foregoing pages, the light beam scanning apparatus of the present invention is adapted to change the scanning density by altering the transport speed in the sub-scanning direction. If it is incorporated in an image recording apparatus, it is capable of recording an image of high quality and in an image reading apparatus, it is capable of reading an image of high quality. This apparatus has a memory unit that stores at least two versions of data representing the intensity of light beam in association with scanning density, and a selector by which the data representing the intensity of the light beam that is associated with a particular scanning density is selected from said memory unit. When the scanning density is changed, the intensity of the light beam is adjusted by allowing the selector to select the appropriate version of data representing the intensity of light beam from the memory unit, and the laser diode which is a light source of recording beam is directly modulated in accordance with the thus selected data representing the intensity of the light beam.

ND filters and other means of adjusting the intensity of light have been necessary in the conventional light beam scanning apparatuses that are adapted to control the scanning density, but the apparatus of the present invention does not have to use such adjusting means. It also obviates the need for providing the space for accommodating such adjusting means and the mechanism for permitting their insertion, whereby said apparatus can be constructed with a simple mechanism, in a small size and at a low cost.

ND filters which are commonly used at the means of adjusting the intensity of light are expensive and are of high quality since they are required to have a surface with a sufficiently high precision of flatness to prevent the occurrence of wavefront aberrations in the light beam when it passes through said ND filters. Thus, the light beam scanning apparatus of the present invention which obviates the need for using such ND filters can be manufactured at a markedly lower cost than the conventional versions of apparatuses that are adapted for adjustments of scanning density.

What is claimed is:

1. A light beam scanning apparatus that uses a light beam deflected in the direction of main scanning in order to perform two-dimensional scanning of a sheet-like subject to be scanned that is moving in a sub-scanning direction which is generally perpendicular to said direction of main scanning, said apparatus comprising:

a light beam source that emits said light beam;

means for altering the speed at which said sheet-like subject moves in the sub-scanning direction in order to change the density of scanning lines formed by said light beam;

a memory unit containing at least two versions of data representing the intensity of said light beam in association with the density of said lines, said at least two versions of data varying from the beginning to the end of each scanned line and comprising standard light intensity data for each scanning position of a single scan, a first version of data representing a high density mode for producing an image of a first quality and a second version of data representing a lesser density mode for producing an image of a second quality; and selection means for selecting one of said at least two versions of data from said memory unit in accordance with the desired density of said scanning lines, wherein said selected version of data causes said intensity of said light beam to be modulated in accordance with clock pulses corresponding to image data, such that said intensity is increased as said scanning density is decreased and said intensity is decreased as said scanning density is increased.

2. A light beam scanning apparatus according to claim 1, wherein said data representing the intensity of said light beam corresponds to a single scan of said light beam.

3. A light beam scanning apparatus according to claim 2, wherein said data representing the intensity of said light beam that corresponds to said single scan of said light beam causes the light beam to be modulated in accordance with the change in scanning speed for a main scanning line on the sheet-like subject.

4. A light beam scanning apparatus according to claim 1 wherein said light beam source is a laser diode.

5. A light beam scanning apparatus according to claim 1 wherein said sheet-like subject to be scanned is a recording material.

* * * * *